United States Patent
Wakim

(10) Patent No.: US 7,954,905 B2
(45) Date of Patent: Jun. 7, 2011

(54) MODULAR MOTORCYCLE HUB SYSTEM

(76) Inventor: Salim Wakim, Anaheim, CA (US)

( * ) Notice: Subject to any disclaimer, the term of this patent is extended or adjusted under 35 U.S.C. 154(b) by 201 days.

(21) Appl. No.: 12/360,047

(22) Filed: Jan. 26, 2009

(65) Prior Publication Data

US 2010/0187898 A1    Jul. 29, 2010

(51) Int. Cl.
*B60B 27/00* (2006.01)
(52) U.S. Cl. .................. 301/110.5; 301/6.9; 188/26
(58) Field of Classification Search .............. 301/110.5, 301/105.1, 6.1, 6.8, 6.9; 188/17, 18 A, 24.11, 188/26, 218 XL
See application file for complete search history.

(56) References Cited

U.S. PATENT DOCUMENTS

| | | | | |
|---|---|---|---|---|
| 1,269,437 | A * | 6/1918 | Hicks | 280/281.1 |
| 5,626,401 | A * | 5/1997 | Terry et al. | 301/59 |
| 6,736,464 | B1 * | 5/2004 | Pidoux | 301/110.5 |
| 7,097,259 | B2 * | 8/2006 | Toyoda | 301/110.5 |
| 2009/0309411 | A1 * | 12/2009 | Perry | 301/110.5 |

* cited by examiner

*Primary Examiner* — S. Joseph Morano
*Assistant Examiner* — Kip T Kotter
(74) *Attorney, Agent, or Firm* — Dylan O. Adams; Graybeal Jackson LLP

(57) ABSTRACT

In an embodiment, a modular motorcycle hub system includes a central hub body with a first and second extension member coupling end; a brake extension member with a first hub body coupling end operable to couple with the central hub body via at least one of the first and second extension member coupling; and a pulley extension member having a second hub body coupling end operable to couple with the central hub body via at least one of the first and second extension member coupling ends.

15 Claims, 8 Drawing Sheets

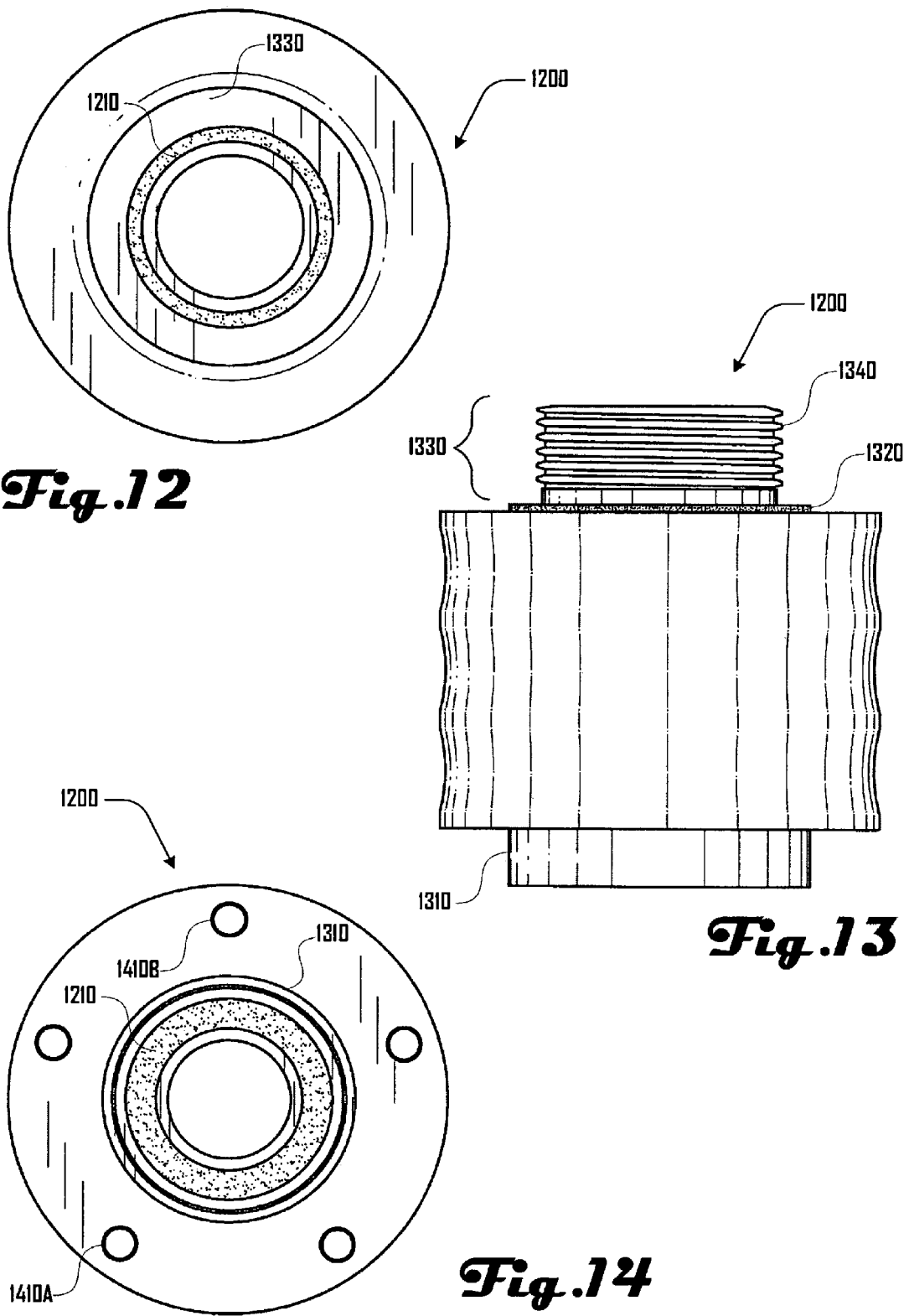

MODULAR MOTORCYCLE HUB SYSTEM

This disclosure relates generally to motorcycles, and more specifically, to systems and methods for providing a modular motorcycle hub system.

BACKGROUND

The first motorcycle was likely built in 1885 by German inventors Gottlieb Daimler and Wilhelm Maybach, although motorized bicycles were present in the eastern United States as early as 1865. Regardless, a motorcycle typically comprises two wheels with one being a front wheel and the other being a rear wheel. These wheels have a central hub, which rotates about an axle that is connected to the motorcycle frame. Additionally, the rear wheel is typically the drive-wheel, whereas the front wheel is not usually powered.

Historically, motorcycle wheels were of limited design, and few wheels were produced aside from stock wheels that came with a motorcycle. However, in the past couple decades, custom motorcycles and parts have become fashionable status symbols, and a wide variety of custom motorcycle parts, including wheels, are now available.

Many custom motorcycle wheels are expensive, and many are made in limited quantities or are one-of-a-kind pieces. Accordingly, motorcycle enthusiasts having highly coveted wheels may desire to move a set of wheels between several motorcycles or mix and match sets of wheels among several motorcycles. Additionally, such motorcycle enthusiasts may desire to interchange wheels with relatively high frequency, and have the ability to attach any given wheel to either the front or back of a motorcycle.

For example, a custom wheel manufacturer may desire to display various wheels during a motorcycle show, and may desire to sell displayed wheels and replace them with other wheels. Additionally, riders may desire to remove expensive wheels when riding in conditions that may damage wheels, or may desire to display and use more expensive wheels when riding in certain areas or venues.

Unfortunately, most motorcycle wheels are not quickly interchangeable because of the diversity in motorcycle and wheel specifications. The required hub size may be different from one motorcycle to the next, or even between the front and rear wheel positions of the same motorcycle.

Additionally, motorcycles have different configurations of brake and pulley systems. For example, a front wheel may have one or two disc brakes, or may have none. Similarly, a rear wheel may have various types of pulley systems, and may or may not have a disc brake system. Therefore, most motorcycle wheels are not interchangeable from the front to the rear position of a single motorcycle, and are not interchangeable from one motorcycle to another.

BRIEF DESCRIPTION OF THE DRAWINGS

The present disclosure will be presented by way of exemplary embodiments but not limitations, illustrated in the accompanying drawings in which like references denote similar elements, and in which:

FIG. 12 is a side view of a first end of a pulley extension member in accordance with an embodiment.

FIG. 13 is a side view of a pulley extension member in accordance with an embodiment.

FIG. 14 is a side view of a second end of a pulley extension member in accordance with an embodiment.

DESCRIPTION

Illustrative embodiments presented herein include, but are not limited to, systems and methods for providing a modular motorcycle hub system.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Figure 1:
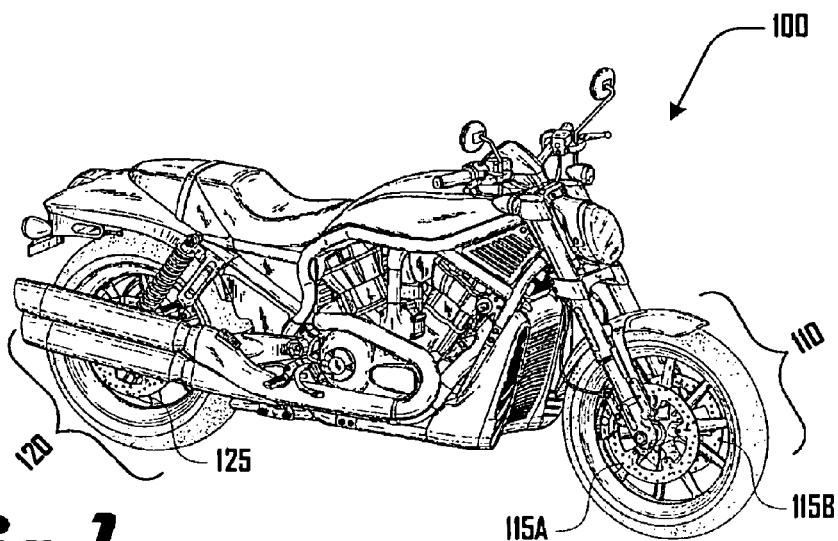
FIG. 1 is a perspective view of an exemplary motorcycle in accordance with an embodiment.
Figure 2:
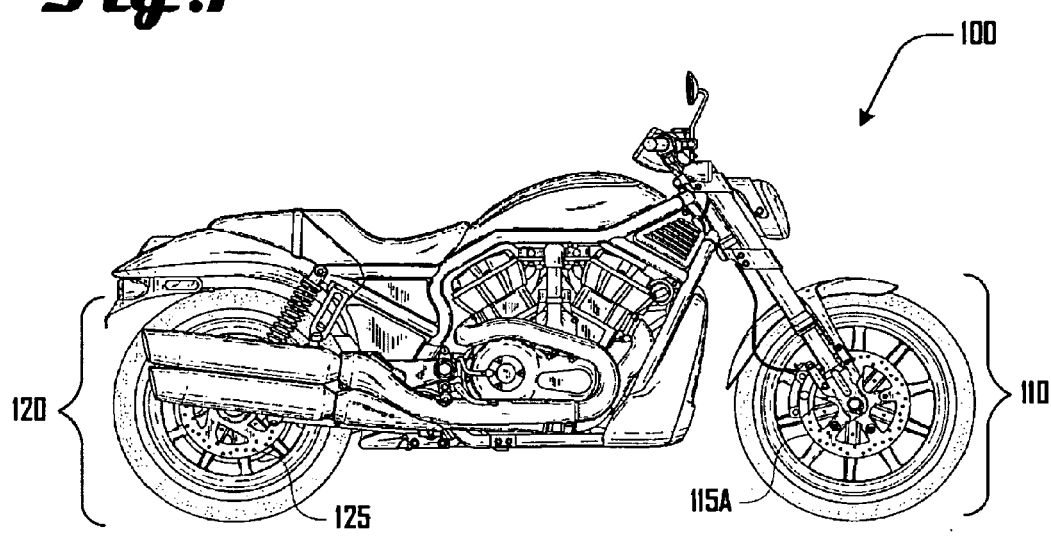
FIG. 2 is a side view of an exemplary motorcycle in accordance with an embodiment.
Figure 3:
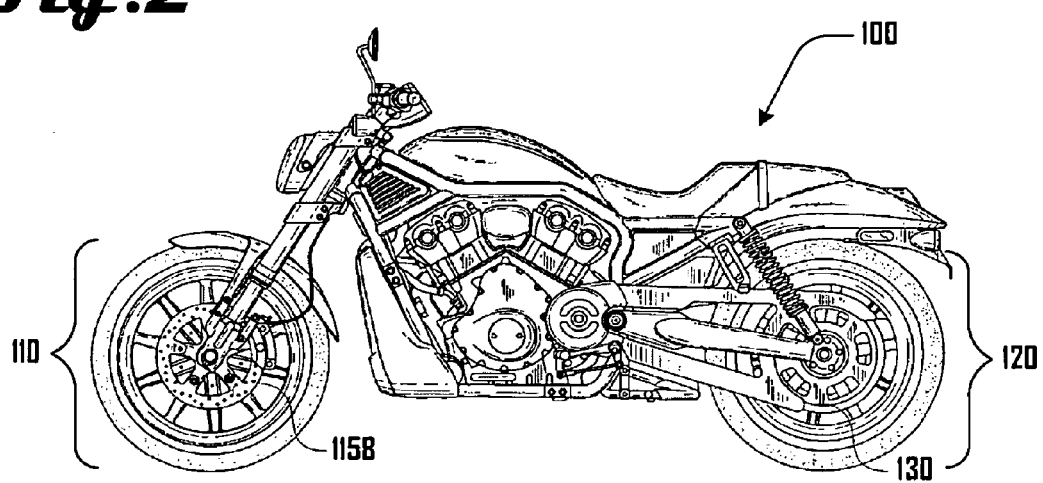
FIG. 3 is a side view of an exemplary motorcycle in accordance with an embodiment.

FIGS. 1-3 depict a perspective view and a first and second side view of an exemplary motorcycle 100 in accordance with an embodiment. As shown in FIGS. 1-3, the exemplary motorcycle 100 comprises a front wheel 110 and a rear wheel 120. In the exemplary motorcycle 100 depicted here, the front wheel 110 has a disc brake system that comprises a first and second disc brake 115A, 115B which are each coupled on one side of a modular hub system 400B. Additionally, the rear wheel 120 comprises a pulley apparatus 130 and a disc brake 125, which are each coupled on one side of a modular hub system 400A.

In some embodiments, the front wheel 110 may comprise a disc brake 115A on one side of a modular hub system 400C, and a second disc brake 115B may be absent on a second side of the modular hub system 400C. In a further embodiment, disc brakes 115 may be absent from both sides of a modular hub system 400.

In further embodiments, a rear wheel 120 may comprise a pulley apparatus 130 and a disc brake 125 may be absent. In a further embodiment, there may be two disc brakes 125 and a pulley apparatus 130 on the rear wheel 120. In still further embodiments, the rear wheel 120 or front wheel 110 may comprise one or more apparatus or system that is analogous to a pulley apparatus 130, such as a drive shaft, belt, chain, and the like.

Figure 4A:
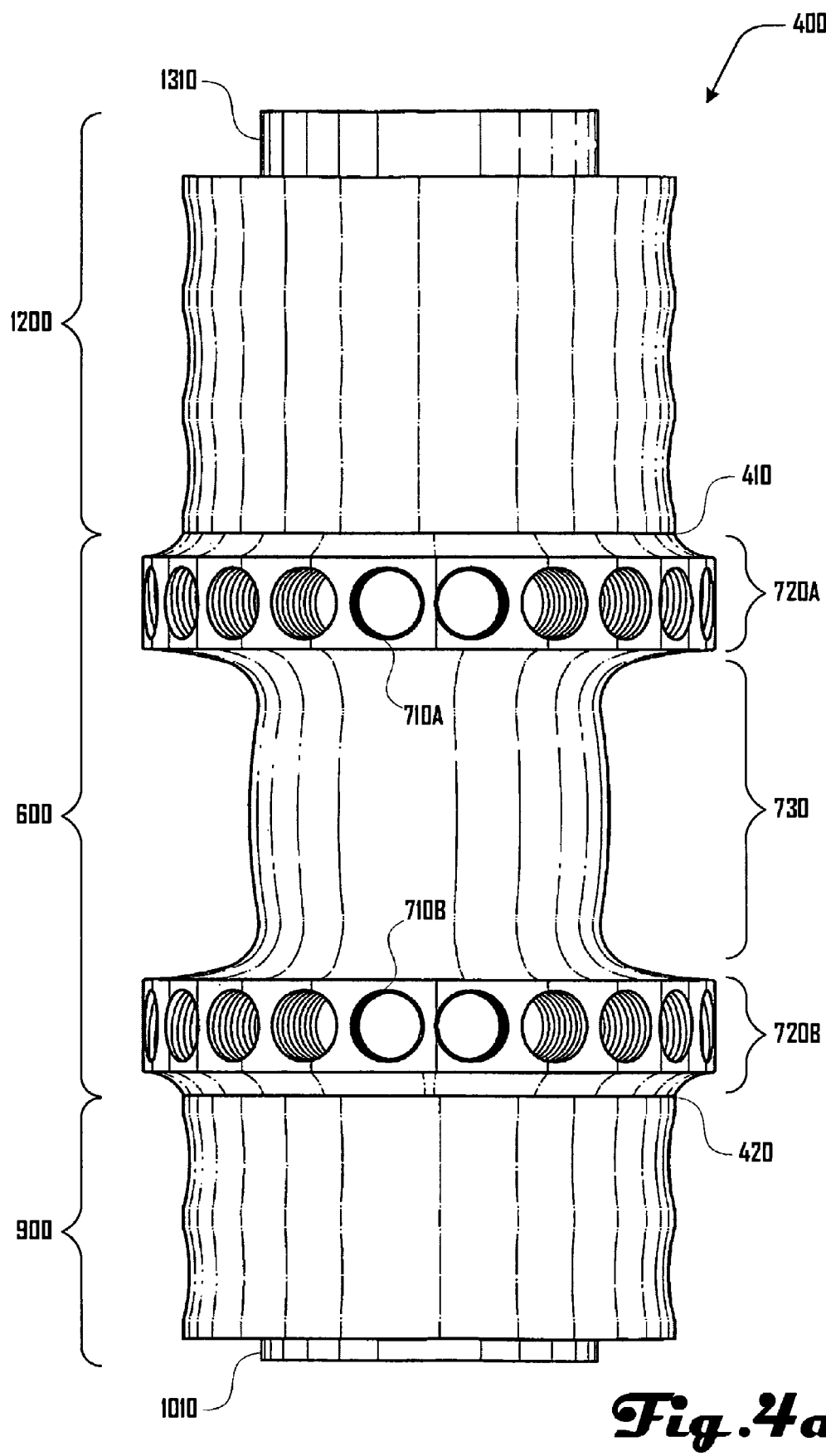
FIG. 4*a* is a side view of a modular motorcycle hub system in accordance with an embodiment.
Figure 4B:
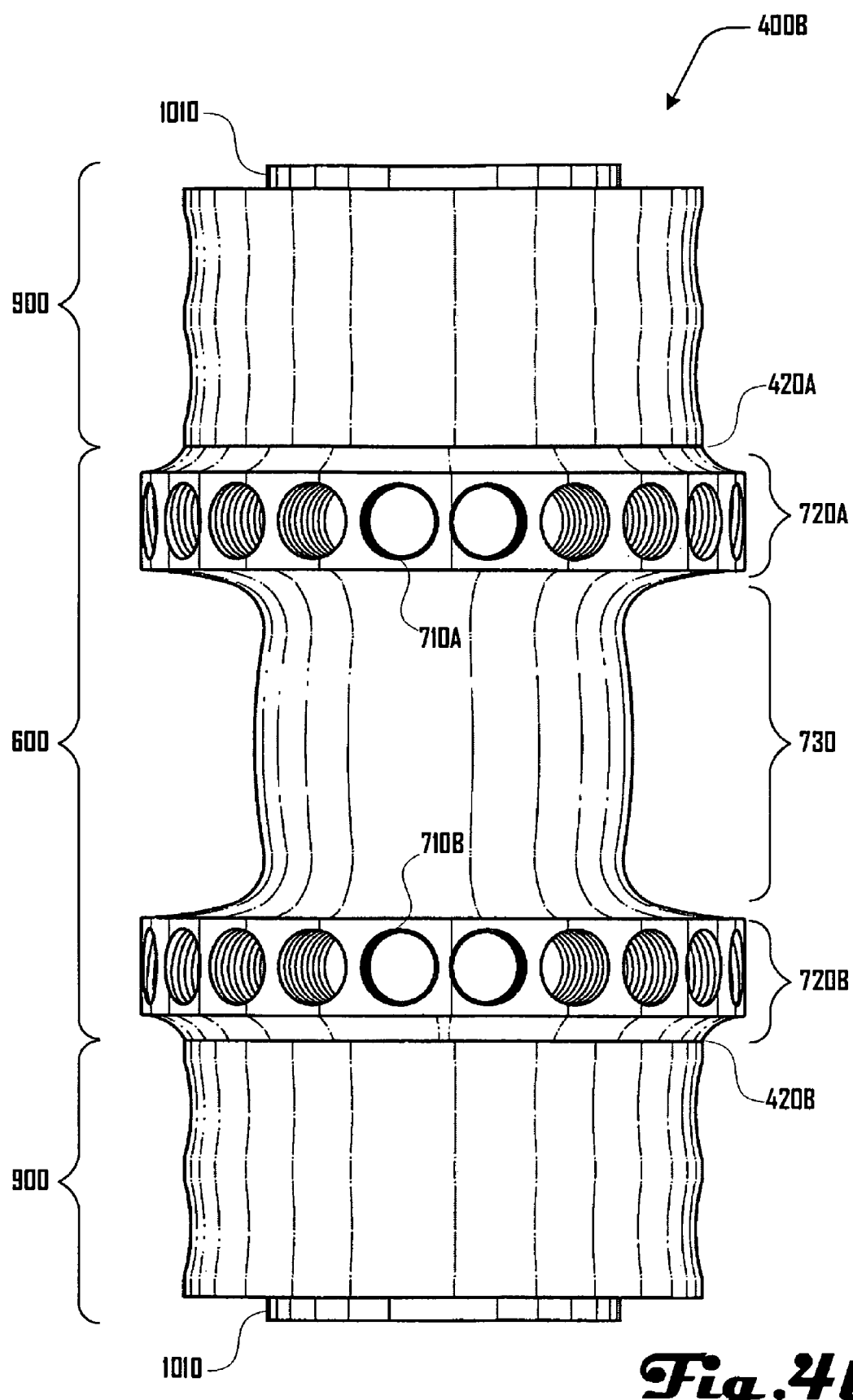
FIG. 4*b* is a side view of a modular motorcycle hub system in accordance with another embodiment.
Figure 4C:
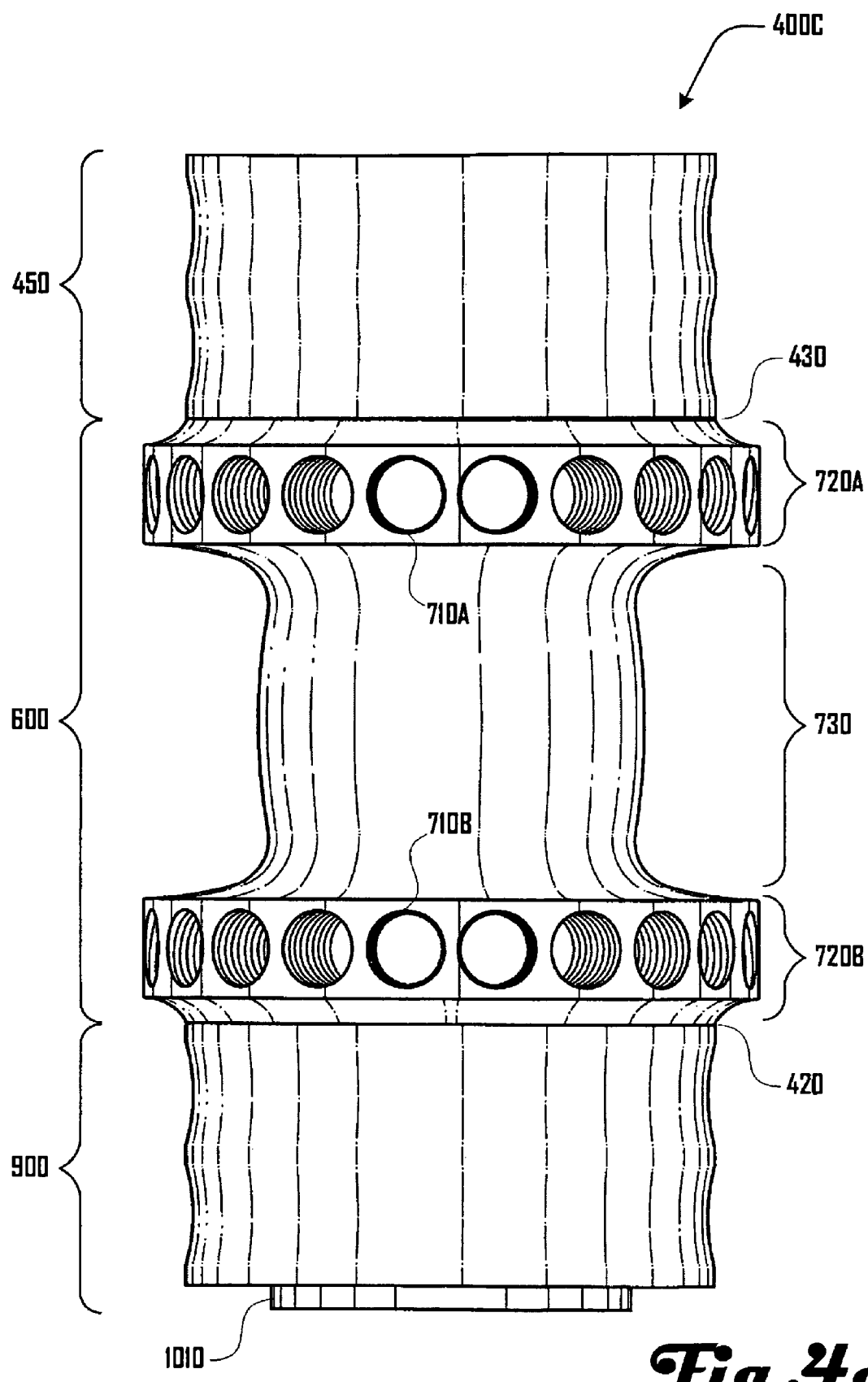
FIG. 4*c* is a side view of a modular motorcycle hub system in accordance with a further embodiment.

FIGS. 4a-4c depict various embodiments of a modular hub system 400 in accordance with various embodiments. The modular hub system 400 comprises a hub body 600. In some embodiments, the modular hub system 400 may comprise one or more brake extension member 900. In further embodiments, the modular hub system 400 may comprise one or more pulley extension member 1200.

In still further embodiments, the modular hub system 400 may comprise one or more variable extension member 450. In yet another embodiment, a variable extension member 450 may be operable to couple with various portions of a motorcycle 100.

As depicted in FIGS. 4a-4c a hub body 600 may be cylindrical, having a concave portion 730 in a middle portion of the hub body 600 and a first and second flaring portion 720B, 720B at a first and second end of the hub body 600. The first and second flaring portion 720A, 720B may each comprise a plurality of spoke orifices 710, which are positioned around the diameter of each end of the hub body 600. In various embodiments, there may be a different number of spoke orifices 710 encircling the first and second end of the hub body 600.

The spoke orifices 710 may comprise threads in the internal portion of the spoke orifice 710. The threads in a spoke orifice 710 may be operable to engage and/or couple with spokes of a motorcycle 100 wheel. In some embodiments, a spoke orifice 710 may comprise various structures that facilitate coupling and/or engaging a spoke of a motorcycle 100 wheel. In further embodiments, a hub body 600 may comprise one or more spokes or other structures that couple to a motorcycle 100 wheel. In other embodiments, a hub body 600 may be an integral portion of a motorcycle 100 wheel.

FIG. 4a depicts a modular hub system 400A that comprises a pulley extension member 1200. The pulley extension member 1200 abuts the hub body 600 at a pulley member junction 410. Additionally, the pulley extension member 1200 includes an extended pulley portion 1310, which extends from an end of the pulley extension member 1200 and may be of a smaller diameter than other portions of the pulley extension member 1200.

In various embodiments, the pulley extension member 1200 may not contact the hub body 600 at the pulley junction 410. In other embodiments, the hub body 600 may contact the pulley extension member 1200 at the pulley member junction 410. In some embodiments, the extended pulley portion 1310 may be various sizes or may be absent.

FIGS. 4a-4c depict a modular hub system 400 comprising at least one brake extension member 900. A brake extension member 900 comprises an extended brake member 1010 and abuts the hub body 600 at a brake member junction 420, 420A, 420B. In some embodiments, the brake extension member 900 may contact the hub body 600 at the brake member junction 420, 420A, 420B or may not be in direct contact.

FIG. 4c depicts a modular hub system 400c comprising a variable extension member 450, which abuts the hub body 600 at variable member junction 430. As shown in FIG. 4c, the variable extension member 450 has a flat end on the exterior end of the variable extension member 450. However, in various embodiments, the variable extension member 450 may comprise various structures that facilitate coupling to various portions of a motorcycle 100.

In some embodiments, the brake extension member 900 may be longer than the pulley extension member 1200. However, in some embodiments, the pulley extension member 1200 and the brake extension member 900 may be of equal length, or the brake extension member 900 may be longer. In further embodiments, the pulley extension member 1200 and the brake extension member 900 may be various lengths.

FIGS. 4a-4c depict exemplary configurations of a modular hub system 400 which are operable to couple with various parts, systems, or apparatuses of a motorcycle 100. For example, the modular hub system 400a depicted in FIG. 4a may be operable to couple with a motorcycle disc brake apparatus 125 and a motorcycle pulley apparatus 130. The modular hub system 400b depicted in FIG. 4b may be operable to couple with a first and second disc brake apparatus 115A, 115B. The modular hub system 400c depicted in FIG. 4c may be operable to couple with a disc brake apparatus and another part of a motorcycle 100 such as a fork.

Figure 5:
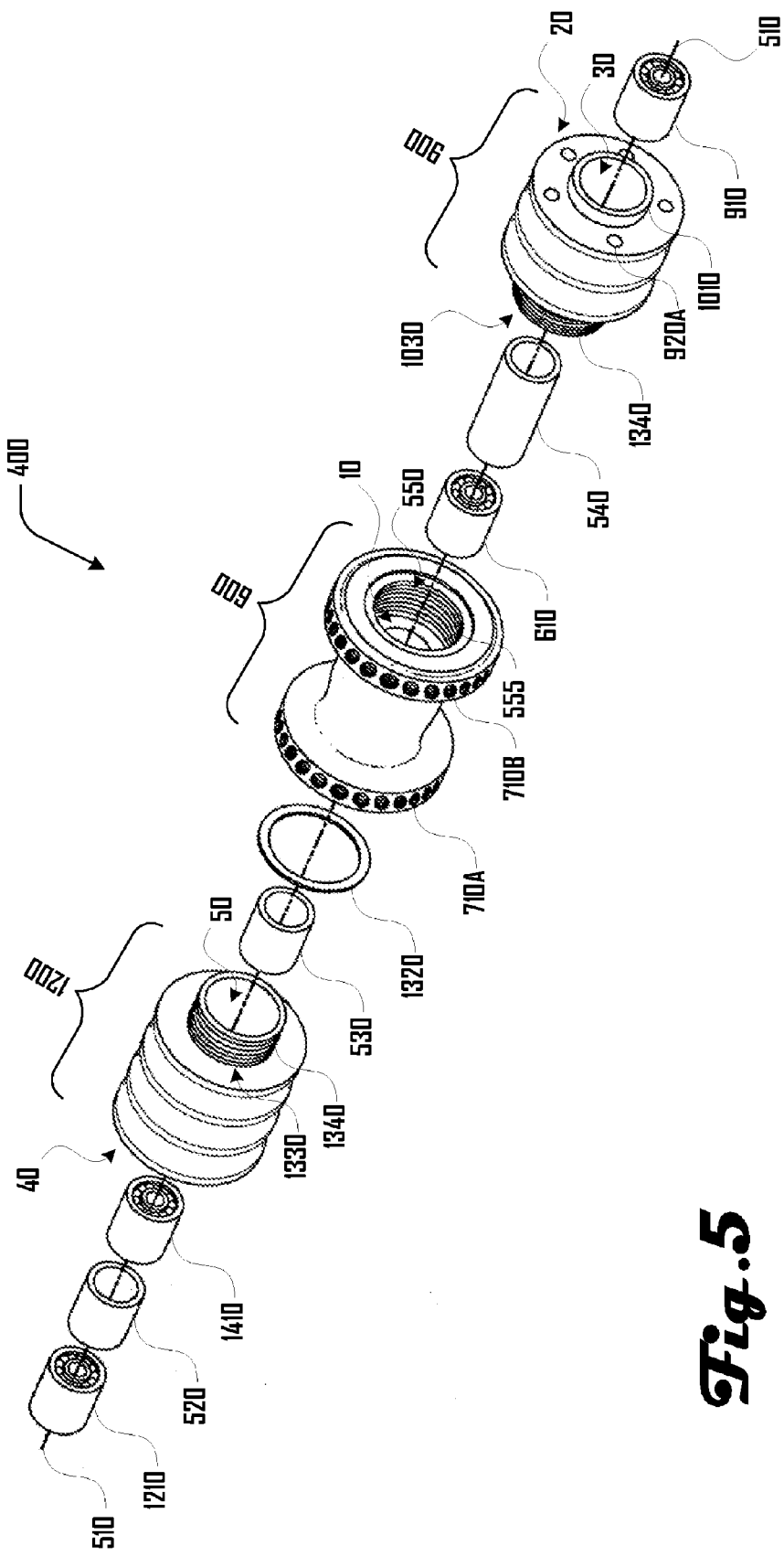
FIG. 5 is an exploded view of a modular motorcycle hub system in accordance with an embodiment.

FIG. 5 depicts an exploded view of an exemplary modular hub system 400, which is extended along a central axis 510. The modular hub system 400 comprises a pulley extension member 1200, a hub body 600 and a brake extension member 900.

FIGS. 5 and 12-14 depict a pulley extension member 1200 that comprises a hub body coupling end 1330, which is an extended cylindrical portion of the pulley extension member 1200, which comprises threads 1340 on the external portion of the hub body coupling end 1330. In various embodiments, the hub body coupling end 1330 is configured to engage and/or couple with complementary threads 555 on a hub body 600. In some embodiments, such a coupling and/or engaging of a hub body 600 and the hub body coupling end 1330 of the pulley extension member 1200 may be in a clockwise or counter clockwise configuration.

Also depicted in FIGS. 5 and 12-14 are a first pulley extension member bearing 1210A, a pulley extension member spacer 520, and a second pulley extension member bearing 1210B. The first and second pulley extension member bearing 1210A, 1210B reside within an orifice in the pulley extension member 1200 and may be separated by the pulley extension member spacer 520.

In various embodiments, the first and second pulley extension member bearing 1210A, 1210B and pulley extension member spacer 520 may be held within the pulley extension member 1200 via friction, an adhesive, welding, a portion of the pulley extension member 1200, and the like. Additionally, in various embodiments, the first and second pulley extension member bearing 1210A, 1210B and pulley extension member spacer 520 may be operable to receive a motorcycle axle therethrough, when the first and second pulley extension member bearing 1210A, 1210B and pulley extension member spacer 520 reside within pulley extension member 1200.

In some embodiments, there may be one or more pulley extension member bearing 1210A, 1210B or a pulley extension member bearing 1210A, 1210B may be absent. Additionally, in some embodiments, there may be one or more extension member spacer 520 or an extension member spacer 520 may be absent.

FIGS. 5-8 depict a hub body 600, which may be a component of the modular hub system 400. The hub body 600 comprises a plurality of spoke orifices 710A, 710B that encircle the hub body 600 on a first and second extended end 720A, 720B.

The hub body 600 also comprises a hub bearing 610 that resides within the hub body 600. The hub bearing may be held within the hub body 600 by friction, an adhesive, welding, a portion of the hub body 600, and the like.

Additionally, the hub body 600 comprises an internal cavity that comprises threads 555 on an extension member coupling end 550. The hub body 600 may comprise threads 555 on both ends of the hub body 600, and both ends of the hub body 600 may comprise an extension member coupling end 550, which is operable to couple with a pulley extension member 1200, a brake extension member 900, or a variable extension member 450.

For example, both ends of the hub body 600 may comprise threads 555 on an extension member coupling end 550, which may be operable to couple with the hub body coupling end 1330 on the pulley extension member 1200. Accordingly, the hub body 600 and the pulley extension member 1200 may be coupled by screwing them together via complementary threads 555, 1340. In various embodiments, the hub bearing 610 may reside within the hub body 600 such that it does not obstruct coupling of various extension members 1200, 600 and allows a motorcycle axle to extend therethrough along the central axis 510

When the hub body 600 and the pulley extension member 1200 are coupled, a hub-pulley spacer 530 may reside within the coupled hub body 600 pulley extension member 1200, and be operable to accept a motorcycle axle therethrough. In various embodiments, the hub-pulley spacer 530 may be of a length sufficient to contact, or nearly contact both the second pulley extension member bearing 1210A, 1210B and hub body bearing 610, which are held within the pulley extension member 1200 and hub body 600 respectively. In some embodiments, the hub-pulley spacer 530 may be various lengths or may be absent.

Additionally, the modular hub system 400 comprises a spacing washer 1320, which may have an internal diameter such that it may encircle the hub body coupling end 1330 of the pulley extension member 1200. In various embodiments, the spacing washer 1320 may prevent the pulley extension member 1200 and hub body 600 from fully coupling or obtaining full contact on the ends that are coupling. For example, the pulley member junction 410 may comprise a space between the pulley extension member 1200 and the hub body 600. Such a configuration may be desirable so as to prevent the pulley extension member 1200 and the hub body 600 from locking together when coupled, and may allow for some rotation about the central axis 510 via the coupling of complementary threads 555, 1340.

In various embodiments, allowing some rotation to occur between the pulley extension member 1200 and the hub body 600 may be desirable because of clockwise and counterclockwise forces exerted on the pulley extension member 1200 by a pulley apparatus 130 when the pulley apparatus 130 is operational. The spacing washer 1320 may allow such forces exerted by a pulley apparatus 130 to be absorbed, deadened, and the like.

In some embodiments, this may support the structural integrity of the modular hub system 400, the pulley apparatus 130, various other motorcycle 100 components, and the like.

In other embodiments, there may be a spacing washer 1320 between various other coupling junctions such as between a hub body 600 and a brake extension member 900 or a variable extension member 450.

FIGS. 5 and 9-11 depict a brake extension member 900 that may be a component of a modular hub system 400. The brake extension member 900 comprises threads 1030 on a second hub coupling end 1020, which may be operable to couple with threads 555 of an extension member coupling end 550 of a hub body 600.

In various embodiments, the brake extension member 900 may couple with the hub body 600 via complementary threads 555, 1030; however, in some embodiments, the brake extension member 900 may couple with the hub body 600 via other coupling structures.

The brake extension member 900 further comprises a brake extension member bearing 910, which resides within the brake extension member 900. The brake extension member bearing 910 may be held within the brake extension member 900 via friction, an adhesive, welding, a portion of the brake extension member 900, and the like. In various embodiments, the brake extension member bearing 510 is operable to accept a motorcycle axle therethrough while residing within the brake extension member 900. In some embodiments, there may be a plurality of brake extension member bearings 910 or a brake extension member bearing 910 may be absent.

Additionally, the brake extension member 900 further comprises an extended brake member 1010 and a plurality of brake coupling orifices 920A, 920B on one end of the brake extension member 900. In various embodiments, the plurality of brake coupling orifices 920A, 920B facilitate the coupling of a brake apparatus, such as a disc brake apparatus 115, 125 to the brake extension member 900.

In some embodiments, various types of brake apparatus may be coupled to the brake extension member 900, via various structures. For example, in some embodiments, there may be various numbers of brake coupling orifices 920A, 920B or brake coupling orifices 920A, 920B may be absent. Additionally, the extended brake member 1010 may be absent or of various sizes in some embodiments.

When the brake extension member 900 and hub body 600 are coupled, a brake-hub spacer 540 may be present within a cavity defied by one or both of the brake extension member 900 and hub body 600. In some embodiments, the brake-hub spacer 540 may be of a length sufficient to contact the hub bearing 610 and the brake extension member bearing 910, which are held within the hub body 600 and brake extension member 900 respectively. In other embodiments, the brake-hub spacer 540 may be of various lengths or may be absent. In further embodiments, the brake-hub spacer 540 may be operable to accept a motorcycle axle therethrough when the extension member 600 and hub body 600 are coupled.

In various embodiments, the modular hub system 400 may comprise one or more pulley extension member 1200, one or more brake extension member 900, or one or more variable extension member 450. Additionally, in some embodiments, various extension members 1200, 600, 450 may be coupled on either end of a hub body 600 and a motorcycle axle may be extended through the entire coupled modular hub system 400 along the central axis 510.

The modular hub system 400 may comprise various types of materials, which may include steel, iron, chrome, aluminum and the like. Additionally, in some embodiments, various portions of the modular hub system 400 may comprise plastic, wood, carbon fiber, a composite material, and the like. Additionally, bearings are well known in the art however, bearings in accordance with various embodiments may be obtained from EBI bearings Co. (EBI Bearings (Ningbo) Co., Ltd., Ningbo, China, see www.ebi-bearings.com)

Figure 6:
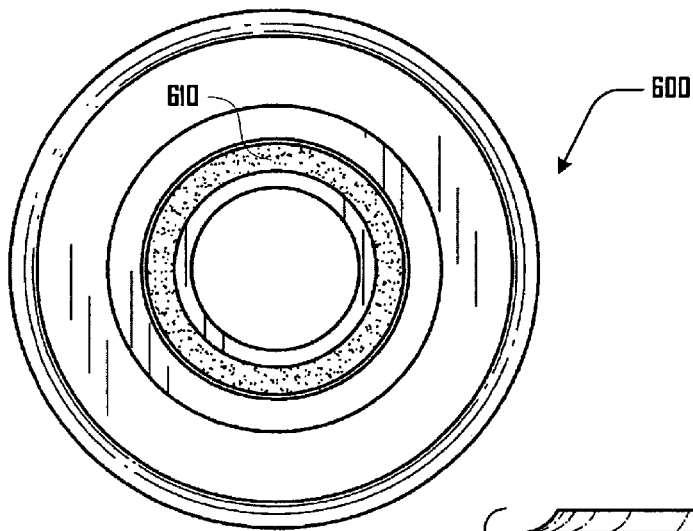
FIG. 6 is a side view of a first end of a central hub body in accordance with an embodiment.
Figure 7:
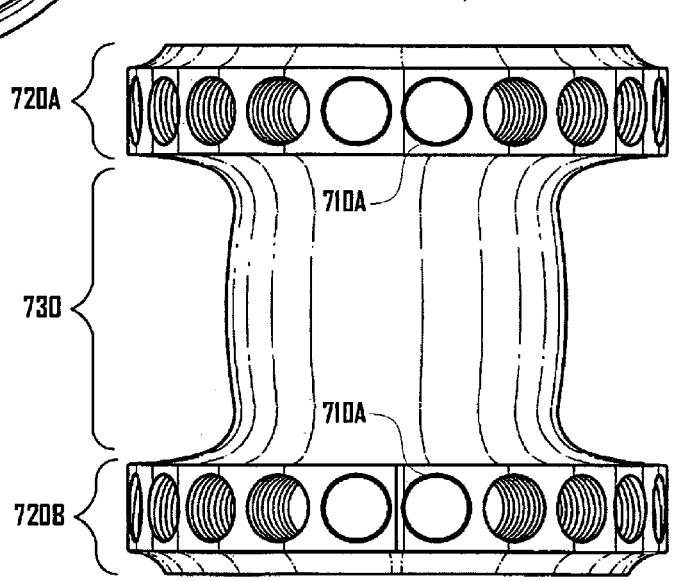
FIG. 7 is a side view of a central hub body in accordance with an embodiment.
Figure 8:
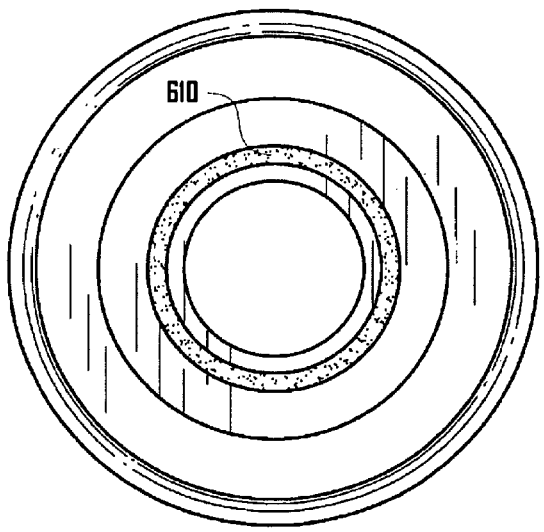
FIG. 8 is a side view of a second end of a central hub body in accordance with an embodiment.

FIGS. 6-8 depict side views of a first and second coupling end and a general size view of hub body 600 in accordance with an embodiment. FIG. 6, depicts a first coupling end of the hub body 600, which comprises a hub body bearing 610, which is held within the hub body 600. FIG. 7 is a side view of a hub body 600, which depicts a plurality of spoke orifices 710, which encircle the perimeter of a first and second extended portion 720A, 720B of the hub body 600. The first and second extended portion 720A, 720B define a concave portion 730 on the hub body 600. Finally, FIG. 8 depicts a second coupling end of the hub body 600, which shows the hub body bearing 610 being held within the hub body 600. The hub body 600 may be operable to accept a motorcycle axle or other axle through the center of the hub body 600.

Figure 9:
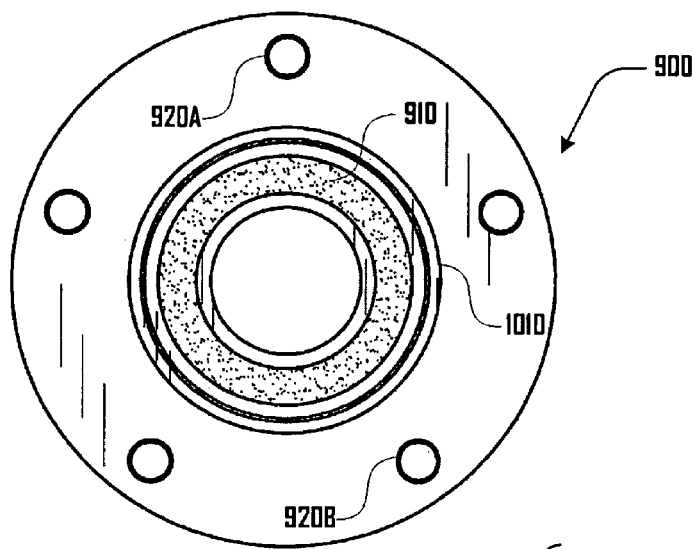
FIG. 9 is a side view of a first end of a brake extension member in accordance with an embodiment.
Figure 10:
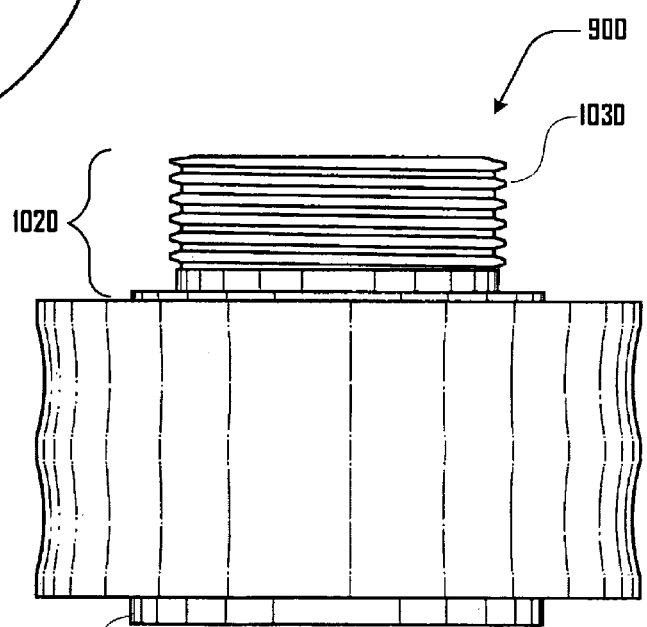
FIG. 10 is a side view of a brake extension member in accordance with an embodiment.
Figure 11:
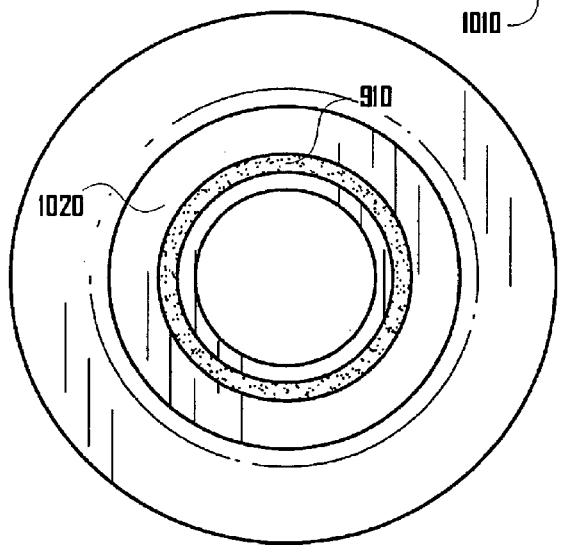
FIG. 11 is a side view of a second end of a brake extension member in accordance with an embodiment.

FIGS. 9-11 depict a side view of a brake extension member 900 and side views of a hub coupling side of a brake extension member 900 and a brake coupling side of a brake extension member 900. FIG. 9 depicts a brake coupling side of a brake extension member 900, which comprises five brake coupling orifices (e.g., 920A, 920B), an extended brake member 1010 and a brake extension member bearing 910, which is held within the brake extension member 900.

In various embodiments, the brake extension member bearing 910 may be flush with the rim of the extended brake member 1010. In some embodiments, there may be various numbers of brake coupling orifices 920A, 920B, which may be positioned in various configurations. Additionally, in some embodiments, a brake apparatus may be coupled to the brake coupling side of a brake extension member 900 by various other structures, and brake coupling orifices 920A, 920B, or the extended brake member 1010 may be absent.

FIG. 10 depicts a side view of a brake extension member 900, which comprises an extended brake member 1010, and a first hub coupling end 1020. The first hub coupling end 1020 may be defined by a cylindrical portion comprising threads 1030 and being of a smaller diameter than other portions of the brake extension member 900. In various embodiments, the first hub coupling end 1020 is operable to couple with corresponding threads 555 on a hub body 600. In some embodiments, the first hub coupling end 1020 may comprise other structures which facilitate coupling with a hub body 600, which may include slots, pins, and the like.

FIG. 11, depicts a coupling side of a brake extension member 900, which comprises a brake extension member bearing 910, which is being held within the brake extension member 900. Additionally depicted is the hub coupling end 1020. In various embodiments, the brake extension member 900 is operable to accept a motorcycle axle through the center of the brake extension member 900 along the central axis 510.

FIGS. 12-14 depict a side view of a pulley extension member 1200 and side views of a hub coupling side of a pulley extension member 1200 and a pulley coupling side of a pulley extension member 1200.

FIG. 12, depicts a coupling side of a pulley extension member 1200, which comprises a first pulley extension member bearing 1210, which is being held within the pulley extension member 1200. Additionally depicted is the hub coupling end 1330. In various embodiments, the pulley extension member 1200 is operable to accept a motorcycle axle through the center of the pulley extension member 900 along the central axis 510.

FIG. 13 depicts a side view of a pulley extension member 1200, which comprises an extended pulley member 1310, and a first hub coupling end 1330. The first hub coupling end 1330 may be defined by a cylindrical portion comprising threads 1340 and being of a smaller diameter than other portions of the pulley extension member 1200. In various embodiments, the first hub coupling end 1330 is operable to couple with corresponding threads 555 on a hub body 600. In some embodiments, the first hub coupling end 1330 may comprise other structures which facilitate coupling with a hub body 600, which may include slots, pins, and the like.

Additionally depicted in FIG. 13 is a spacing washer 1320, which may facilitate spacing between the pulley extension member 1200 when coupled with a hub body 600.

FIG. 14 depicts a pulley coupling side of a pulley extension member 1200, which comprises five pulley coupling orifices (e.g., 1410A, 1410B), an extended pulley member 1310 and a second brake extension member bearing 1210, which is held within the brake extension member 900.

In one embodiment, there may be a modular motorcycle hub system comprising: a central hub body comprising: a hub body central axis; a first extension member coupling end; a second extension member coupling end parallel to said first extension member coupling end and perpendicular to said hub body axis; and a first axle orifice 10 defined by said central hub body parallel to said hub body central axis and traversing said central hub body from said first extension member coupling end to said second extension member coupling end;

a brake extension member comprising: a brake extension member central axis; a first hub body coupling end operable to couple with said central hub body via at least one of said first and second extension member coupling end such that said brake extension member central axis is parallel to said hub body central axis; a brake coupling end 20 parallel to said first hub body coupling end operable to couple with a motorcycle brake; and a second axle orifice 30 parallel to said brake extension member central axis and traversing said brake extension member from said first hub body coupling member end to said brake coupling end 20, and a pulley extension member comprising: a pulley extension member central axis; a second hub body coupling end operable to couple with said central hub body via at least one of said first and second extension member coupling ends such that said pulley extension member central axis is parallel to said hub body central axis; a pulley coupling end 40 parallel to said second hub body coupling end and operable to couple with a motorcycle pulley apparatus; and a third axle orifice 50 parallel to said pulley extension member central axis and traversing said pulley extension member from said first hub body coupling member to said pulley coupling end 40.

In an embodiment, there may be a modular motorcycle hub system comprising: a central hub body comprising: a hub body central axis; a first extension member coupling end; a second extension member coupling end parallel to said first extension member coupling end and perpendicular to said hub body axis; and a first axle orifice 10 defined by said central hub body parallel to said hub body central axis and traversing said central hub body from said first extension member coupling end to said second extension member coupling end.

Additionally, the modular motorcycle hub system may comprise a brake extension member comprising: a brake extension member central axis; a first hub body coupling end operable to couple with said central hub body via at least one of said first and second extension member coupling end such that said brake extension member central axis is parallel to said hub body central axis; a brake coupling end 20 parallel to said first hub body coupling end operable to couple with a motorcycle brake; and a second axle orifice 30 parallel to said brake extension member central axis and traversing said brake extension member from said first hub body coupling member end to said brake coupling end 20.

Additionally, the modular motorcycle hub system may comprise a second brake extension member comprising: a second brake extension member central axis; a second hub body coupling end operable to couple with said central hub body via at least one of said first and second extension member coupling end such that said second brake extension member central axis is parallel to said hub body central axis; a second brake coupling end parallel to said second hub body coupling end operable to couple with a motorcycle brake; and a third axle orifice parallel to said second brake extension member central axis and traversing said second brake extension member from said second hub body coupling member end to said second brake coupling end.

Additionally, the modular motorcycle hub system may comprise a pulley extension member comprising: a pulley extension member central axis; a second hub body coupling end operable to couple with said central hub body via at least one of said first and second extension member coupling ends such that said pulley extension member central axis is parallel to said hub body central axis; a pulley coupling end 40 parallel to said second hub body coupling end and operable to couple with a motorcycle pulley apparatus; and a third axle orifice parallel 50 to said pulley extension member central axis and traversing said pulley extension member from said first hub body coupling member to said pulley coupling end 40.

Additionally, although specific embodiments have been illustrated and described herein, it will be appreciated by those of ordinary skill in the art and others that a wide variety of alternate and/or equivalent implementations may be substituted for the specific embodiment shown in the described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The invention claimed is:

1. A modular motorcycle hub system comprising:
a central hub body comprising:
a hub body central axis;
a first extension member coupling end;
a second extension member coupling end parallel to said first extension member coupling end and perpendicular to said hub body axis; and
a first axle orifice defined by said central hub body parallel to said hub body central axis and traversing said central hub body from said first extension member coupling end to said second extension member coupling end;
a brake extension member comprising:
a brake extension member central axis;
a first hub body coupling end operable to couple with said central hub body via at least one of said first and second extension member coupling end such that said brake extension member central axis is parallel to said hub body central axis;
a brake coupling end parallel to said first hub body coupling end operable to couple with a motorcycle brake; and
a second axle orifice parallel to said brake extension member central axis and traversing said brake extension member from said first hub body coupling member end to said brake coupling end, and a pulley extension member comprising:
a pulley extension member central axis;
a second hub body coupling end operable to couple with said central hub body via at least one of said first and second extension member coupling ends such that said pulley extension member central axis is parallel to said hub body central axis;
a pulley coupling end parallel to said second hub body coupling end and operable to couple with a motorcycle pulley apparatus; and
a third axle orifice parallel to said pulley extension member central axis and traversing said pulley extension member from said first hub body coupling member to said pulley coupling end,
wherein said hub body and said brake coupling end are operable to be coupled via corresponding threads on said first hub coupling end and at least one of said first and second extension member coupling end.

2. The motorcycle hub system of claim 1, wherein said hub body and said pulley coupling end are operable to be coupled via corresponding threads on said second hub coupling end and at least one of said first and second extension member coupling end.

3. The motorcycle hub system of claim 1, wherein said hub body and said brake coupling end are operable to be coupled via corresponding threads on said first hub coupling end and said first extension member coupling end, and
wherein said hub body and said pulley coupling end are operable to be coupled via corresponding threads on said second hub coupling end and said second extension member coupling end.

4. The motorcycle hub system of claim 3, wherein a contiguous axle orifice is created comprising the first, second, and third axle orifices, when the hub body, pulley extension member, and brake extension member are coupled which traverses the coupled motorcycle hub system from the pulley coupling end to the brake coupling end.

5. The motorcycle hub system of claim 1, wherein said hub body comprises at least one bearing residing within said first axle orifice and further defines said first axle orifice.

6. The motorcycle hub system of claim 1, wherein said brake extension member comprises at least one bearing residing within said second axle orifice and further defines said second axle orifice.

7. The motorcycle hub system of claim 1, wherein said pulley extension member comprises at least one bearing residing within said third axle orifice and further defines said third axle orifice.

8. The motorcycle hub system of claim 7, comprising two bearings residing within said third axle orifice and further define said third axle orifice.

9. The motorcycle hub system of claim 1, wherein said brake extension member has a length that is shorter than said pulley extension member.

10. The motorcycle hub system of claim 1, further comprising a washer, wherein said washer is operable to prevent locking between said pulley extension member and said hub body, when said pulley extension member and said hub body are coupled.

11. The motorcycle hub system of claim 1, wherein said second hub body coupling end comprises an extended portion comprising threads and having a smaller diameter than a portion of said pulley extension member.

12. The motorcycle hub system of claim 11, further comprising a washer, wherein said washer is operable to encircle said extended portion.

13. The motorcycle hub system of claim 1, wherein said first hub body coupling end comprises an extended portion comprising threads and having a smaller diameter than a portion of said brake extension member.

14. A modular motorcycle hub system comprising:
a central hub body comprising:
  a hub body central axis;
  a first extension member coupling end;
  a second extension member coupling end parallel to said first extension member coupling end and perpendicular to said hub body axis; and
  a first axle orifice defined by said central hub body parallel to said hub body central axis and traversing said central hub body from said first extension member coupling end to said second extension member coupling end;
a brake extension member comprising:
  a brake extension member central axis;
  a first hub body coupling end operable to couple with said central hub body via at least one of said first and second extension member coupling end such that said brake extension member central axis is parallel to said hub body central axis;
  a brake coupling end parallel to said first hub body coupling end operable to couple with a motorcycle brake; and
  a second axle orifice parallel to said brake extension member central axis and traversing said brake extension member from said first hub body coupling member end to said brake coupling end;
a pulley extension member comprising:
  a pulley extension member central axis;
  a second hub body coupling end operable to couple with said central hub body via at least one of said first and second extension member coupling ends such that said pulley extension member central axis is parallel to said hub body central axis;
  a pulley coupling end parallel to said second hub body coupling end and operable to couple with a motorcycle pulley apparatus; and
  a third axle orifice parallel to said pulley extension member central axis and traversing said pulley extension member from said first hub body coupling member to said pulley coupling end; and
a washer operable to prevent locking between said pulley extension member and said hub body, when said pulley extension member and said hub body are coupled.

15. A modular motorcycle hub system comprising:
a central hub body comprising:
  a hub body central axis;
  a first extension member coupling end;
  a second extension member coupling end parallel to said first extension member coupling end and perpendicular to said hub body axis; and
  a first axle orifice defined by said central hub body parallel to said hub body central axis and traversing said central hub body from said first extension member coupling end to said second extension member coupling end;
a brake extension member comprising:
  a brake extension member central axis;
  a first hub body coupling end operable to couple with said central hub body via at least one of said first and second extension member coupling end such that said brake extension member central axis is parallel to said hub body central axis;
  a brake coupling end parallel to said first hub body coupling end operable to couple with a motorcycle brake; and
  a second axle orifice parallel to said brake extension member central axis and traversing said brake extension member from said first hub body coupling member end to said brake coupling end; and
a pulley extension member comprising:
  a pulley extension member central axis;
  a second hub body coupling end operable to couple with said central hub body via at least one of said first and second extension member coupling ends such that said pulley extension member central axis is parallel to said hub body central axis;
  a pulley coupling end parallel to said second hub body coupling end and operable to couple with a motorcycle pulley apparatus; and
  a third axle orifice parallel to said pulley extension member central axis and traversing said pulley extension member from said first hub body coupling member to said pulley coupling end,
wherein said first hub body coupling end comprises an extended portion comprising threads and having a smaller diameter than a portion of said brake extension member.

* * * * *